United States Patent [19]

Buettiker

[11] Patent Number: 4,725,403

[45] Date of Patent: Feb. 16, 1988

[54] BOX-TYPE FLOW DEFLECTOR FOR NUCLEAR FUEL GRID

[75] Inventor: Paul Buettiker, Bloomfield, Conn.

[73] Assignee: Combustion Engineering, Inc., Windsor, Conn.

[21] Appl. No.: 930,612

[22] Filed: Nov. 14, 1986

[51] Int. Cl.⁴ .................................................. G21C 3/34
[52] U.S. Cl. ..................................... 376/439; 376/443
[58] Field of Search ................................. 376/439, 443

[56] References Cited

U.S. PATENT DOCUMENTS

| | | | |
|---|---|---|---|
| 3,764,470 | 10/1973 | Calvin | 376/439 |
| 3,787,285 | 1/1974 | Marstrand | 376/439 |
| 3,844,888 | 10/1974 | Calvin | 376/439 |
| 3,886,038 | 5/1975 | Raven | 376/439 |
| 4,089,741 | 5/1978 | Patterson | 376/439 |

Primary Examiner—Donald P. Walsh
Attorney, Agent, or Firm—John H. Mulholland

[57] ABSTRACT

Fuel elements (16) support grids have openings (22,24) in the intersecting matrix strip (12,14) edges adjacent their points of intersection in which box-shaped conduit means (20) with integral mixing vanes (30 and 32) on the flow exit end (28) are secured. The vanes (30,32) create flow in two offset and oppositely transverse directions (34 and 36) relative to the direction of flow through the conduit means in order to generate thermal-hydraulic performance improving vortices (18) in the flow sub-channels defined by the diagonal gaps between fuel elements (16). The box-shaped conduit means (20) also improve grid strength and rigidity.

7 Claims, 3 Drawing Figures

BOX-TYPE FLOW DEFLECTOR FOR NUCLEAR FUEL GRID

BACKGROUND OF THE INVENTION

This invention relates to nuclear fuel assemblies of the type typically used in light water reactors, and more particularly, to features which improve the heat transfer between the fuel and coolant medium passing through the fuel assembly.

The importance of critical heat flux in the design of nuclear fuel assemblies and in the operation of commercial nuclear power plants is well known to practitioners in the field of nuclear power. Considerable design and testing efforts are directed toward optimizing the fuel assembly thermal hydraulic performance, while minimizing the effects of fuel assembly structure on the neutronics performance of the fuel. Typical fuel assemblies for commercial light water nuclear power reactors have a plurality of grids for defining square matrices of aligned and supported fuel rods which are spaced apart sufficiently to permit flow between the rods thereby to transfer heat to the fluid medium. The thermal-hydraulic optimization effort is directed toward maximizing heat transfer without approaching the critical heat flux, which condition results in a precipitous drop in the heat transfer coefficient between the rod and the fluid and a significant rise in the fuel clad temperature. Fuel assembly design changes that increase the critical heat flux provide the advantages of greater operating margin or increased core power rating.

Ideally, the velocity of the fluid is the same throughout the fuel assembly to guaranty that heat transfer from the fuel rods to the coolant fluid is maximized and local hot spots and the premature occurrence of boiling are prevented. This is important because premature occurrence of boiling reduces the possible level of energy production. Inherently, under axial flow conditions and without flow deflector structures, the flow velocity in the square matrices is less in the gaps between the in-line adjacent rods than in the wider gaps between the diagonally adjacent rods of the square matrix. Therefore, circumferential variations in the fuel rod heat transfer and temperature distributions inherently occur. In addition, variations also occur between different sides and regions of a given fuel assembly. Such variations are, at least to some degree, dependent on the location of the individual fuel assembly within the reactor core.

To effect some degree of improvement in approaching the above stated ideal, fuel designers have engineered a large variety of mixing and flow directing devices. The various mixing devices have helped by increasing the critical heat flux and thereby retarding the first onset of the critical heat flux anywhere on the assembly when compared to the assembly without the mixing device. A limiting factor, however, is that fuel assembly mixer designs must not increase the pressure drop across the grids beyond that which is tolerable.

For over two decades, it has been recognized that the provision of flow deflector structure on the fuel assembly grids can promote fluid mixing and thereby increase the critical heat flux. U.S. Pat. No. 3,379,619 entitled "Fuel Assembly for Nuclear Reactors" typifies the early flow mixing tabs carried by the grids. Many variations of this tab flow mixer, possibly numbering in the hundreds, have been used or proposed by practitioners in this field. Virtually all such variations are designed to promote "inter-subchannel mixing". A subchannel is defined as the fluid path, or "channel", which is more or less enclosed by three or four fuel rods. Fluid in one subchannel can mix with the fluid in neighboring subchannels through the gaps between fuel rods. Inter-subchannel mixing is the term used to describe this mixing between subchannels. These types of flow deflectors are effective for maintaining sub-cooled conditions by mixing liquid at different temperatures.

German Pat. No. 1,244,981 and U.S. Pat. No. 3,847,736 "Flow Twister For A Nuclear Reactor", exemplify the less common approach of using flow deflection means that have the effect of fluid mixing within the subchannel, with relatively low inter-subchannel mixing.

U.S. Pat. No. 3,589,438 "Spacer Grid For Heat Exchanger Elements With Eddy Diffusion Promotion Means" teaches hexagonal fuel rod cells 18 containing fuel rods 10. Irregular edges 28 and 29 of strips 17 defining the cells 18 act as flow deflectors.

U.S. patent application Ser. No. 843,525 filed March 24, 1986 by Parrette and Marshall and entitled "Nuclear Fuel Assembly Having Composite Mixing Grids" is assigned to the same assignee as the present application. The Parrette and Marshall application teaches an assembly in which a plurality of grids of a first type are spaced over the lower portion of a fuel assembly and at least one grid of a second type is located over these and has flow deflector structures associated with it for imparting a swirling motion within the flow subchannels to a greater extent than provided by the first type of grid. It does not, however, teach the present invention which includes a fuel assembly utilizing a box-type flow deflector grid to produce subchannel vortices.

SUMMARY OF THE INVENTION

The box-type flow deflector structure of the present invention is incorporated in a fuel element support grid for supporting an array of nuclear fuel elements intermediate their ends. The grid includes a plurality of fuel element containing cells defined and second orthographically intersecting and slottedly interlocked separate grid-forming matrix strips. A plurality of openings interrupt the edges of the intersecting matrix strips at at least some of their intersections within the coolant flow subchannels defined by fuel elements in cells adjacent to those intersections. Box-shaped conduit means are located within the plurality of openings. These conduit means include a flow entry end and a flow exit end and means for deflecting coolant flow from the box-shaped conduit means flow exit end which generate vortices in the subchannels. The mixing vanes at the flow exit end of the box-shaped conduit means are projecting vanes integral with opposite sides of the box-shaped conduit means. The projecting vanes create flow into offset and oppositely transverse directions relative to the direction of flow through the conduit means in order to generate the vortices in the subchannels. By means of this structure, an optimization of the thermal-hydraulic flow characteristics is obtained which maximizes heat transfer without approaching the critical heat flux and without creating a significant rise in fuel clad temperature. This provides the advantages of greater operating margin or increased core power rating.

This is effected because the vortices or swirling flow increases the critical heat flux and heat transfer rate by improving the boundry layer conditions on the surfaces of the fuel elements through increased velocity gradients in the boundry layer and the replacement of steam bubbles in the boundry layer with the denser liquid of the subchannel. The importance of the fact that the swirl or vortices are in the subchannels, as opposed to around the elements or the rods themselves, is that they persist longer downstream from the grid and conduit means structure.

Moreover, the box-shaped insert or conduit means collects flow from regions of high momentum, in contrast to other designs where low momentum flow immediately adjacent to the matrix strip surface is manipulated. The box-shaped conduit means also insures that all the flow collected will be deflected by the bent tabs or mixing vanes at the flow exit end of the conduit means because the two offset transversely directed mixing vanes affect all of the flow through the conduit means. The box-shaped conduit design also provides the very desirable property of structurally strengthening and rigidifying the fuel element support grid without significantly increasing the pressure loss incurred incurred across the grid.

DETAILED DESCRIPTION OF THE PREFERRED EMBODIMENT

Figure 2:
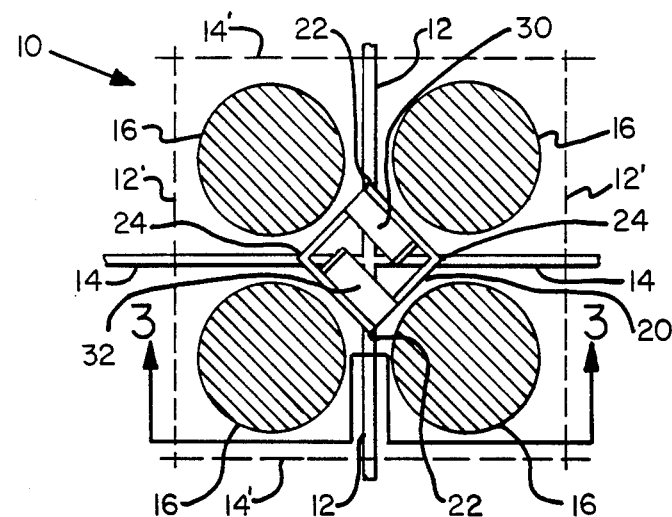
FIG. 2 is a schematic cross-sectional view of four fuel elements containing cells defined by first and second intersecting grid-forming matrix strips and a box-shaped conduit having flow exit vanes located in the fuel-element-defined subchannels, in accordance with the principals of the invention.
Figure 3:
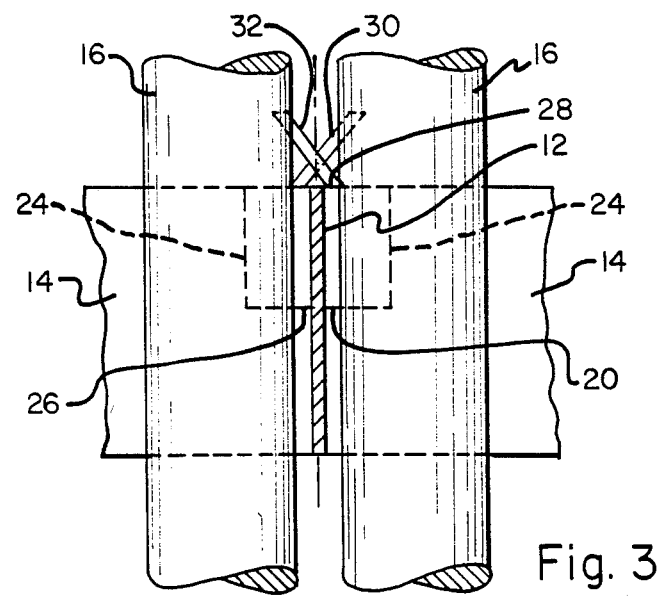
FIG. 3 is a fragmentary schematic elevational view taken in the direction illustrated by the arrows and line 3—3 of FIG. 2.

The numeral 10 generally designates the area of intersection of first and second grid-forming matrix strips 12 and 14, respectively, of a grid for supporting an array of fuel elements 16. The fuel elements or rods 16 are held in cells defined by the matrix strips 12 and 14 in combination with a plurality of like intersecting matrix strips 12' and 14' schematically shown in FIG. 2 by dotted lines. It will be understood that grid-formiqg matrix strips 12, 12', 14 and 14' make up a total array which may typically have fourteen to seventeen fuel elements per row and fourteen to seventeen fuel elements per column. Accordingly, the fuel elements 16 and the grid-forming matrix strips 12 and 14 show merely a representative portion of a fuel element support grid and fuel elements therewith. The fuel elements 16 define a subchannel as the coolant flows in a direction parallel to the length of the fuel elements 16 in an upward direction.

Figure 1:
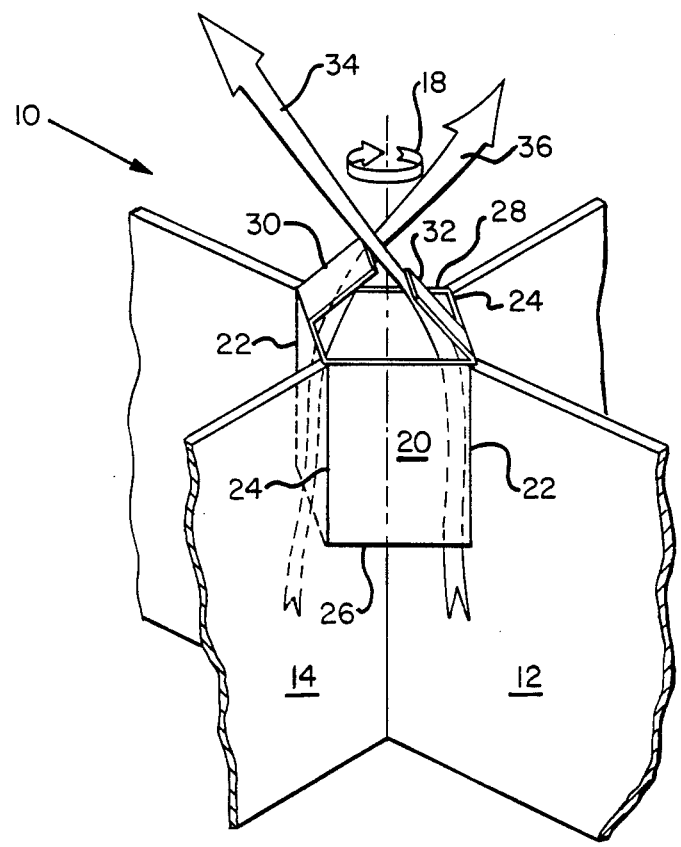
FIG. 1 is an isometric view of a fuel element support grid matrix strip intersection including the box-shaped conduit and flow exit vanes to generate subchannel vortices in accordance with the principals of the invention, as schematically shown.

In order to deflect the flow in the subchannel and create vortices therein, as illustrated by the arrow 18 in FIG. 1, a box-shaped conduit means 20 is provided at the intersections of the grid-forming matrix strips 12, 12', 14 and 14'. The strips 12 and 14 have along their length, at intersections thereof, a plurality of openings or cutouts 22 and 24, respectively. The cutouts 22 and 24 have an extent along the strip edge equal to the overall diagonal length of the box-shaped conduit means 20. Accordingly, the conduit means can be mounted and secured, as by welding, symmetrically about the intersection of the strips 12 and 14 and their companion strips 12' and 14' within the flow of coolant through the subchannel defined in the diagonal gaps between the adjacent fuel elements 16.

As the coolant flows upwardly, it enters the box-shaped conduit means 20 at a flow entry end 26 and continues upwardly to a flow exit end 28. As it leaves the flow exit means 28 in a continuation of its upward travel within the subchannel, means in the form of mixing vanes 30 and 32, which are integrally attached to the flow exit end 24 of the box-shaped conduit means 20 on opposite sides thereof, deflect the fluid to create flow into offset and oppositely transverse directions relative to the direction of flow through the conduit means. In this manner, the desired vortices are generated. The flow path is schematically and generally indicated by arrows 34 and 36 in FIG. 1 and it is this oppositely directed flow which creates the vortices with flow in the direction schematically shown by the arrow 18 within the subchannel. Thus, it will be seen that the grid-forming matrix strips 12, 12', 14, and 14', together with the box-shaped conduit means 20 and mixing vanes 30 and 32, create the swirl or vortex desired for improved thermal hydraulic effects as discussed hereinbefore.

The grid strips and the box-shaped conduit means are typically made from Zircalloy or other materials commonly used in the production of the slottedly interlocked grid-forming matrix strips making up the cells for the individual fuel elements or rods 16. It will be appreciated that the fuel elements or rods 16 are held in place by arches and springs in a manner well known to those skilled in the art so that they remain substantially centered within their individual cells despite forces from coolant flow or seismic occurrences which might otherwise disturb their positioning. Such structure in no way forms a part of the present invention and it should be recognized that the concept of using a square or other geometrically shaped conduit means in the subchannel, with mixing vanes to create vortices which will survive and persist for a significant distance of flow beyond the grid, can be used regardless of the particular spring and arch arrangement utilized to hold the fuel element 16 in position.

I claim:
1. In a fuel element support grid for supporting an array of nuclear fuel elements intermediate their ends, said grid including a plurality of fuel element containing cell defined by first and second orthographically and slottedly intersecting grid-forming matrix strips, the improvement comprising:
   a plurality of openings interrupting edges of orthographically and slottedly intersecting separate matrix strips at at least some of their intersections within coolant flow subchannels defined by fuel elements in cells adjacent those intersections;
   conduit means located within said plurality of openings;
   said conduit means including a flow entry end and a flow exit end; and
   means deflecting coolant flow from said conduit means'flow exit end to generate vortices in siad subchannels.

2. The fuel element support grid of claim 1 in which the conduit means is box-shaped.

3. The fuel element support grid of claim 2 in which the box-shaped conduit means includes mixing vanes as the means deflecting coolant flow from said flow exit end to generate vortices in said subchannels.

4. The fuel element support grid of claim 1 in which the mixing vanes are attached to the conduit means' flow exit end.

5. The fuel element support grid of claim 4 in which the mixing vanes are shaped to create flow in two offset and oppositely transverse directions relative to the direction of flow through the conduit means in order to generate the vortices.

6. The fuel element support grid of claim 5 in which the mixing vanes are projecting vanes integral with opposite sides of a box-shaped conduit means.

7. The fuel element-support grid of claim 2 in which the corners of the box-shaped conduit means are each secured to a grid-forming matrix strip to provide the grid with additional strength and rigidity.

* * * * *